N. M. SIMONDS.
LIQUID HEATER.
No. 190,631. Patented May 8, 1877.
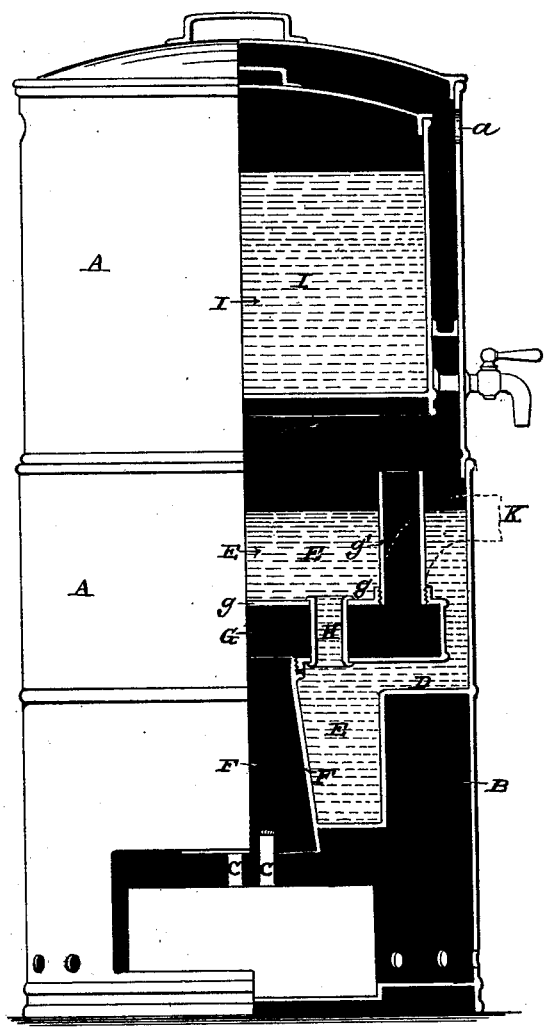

UNITED STATES PATENT OFFICE.

NATHANIEL M. SIMONDS, OF ST. LOUIS, MISSOURI.

IMPROVEMENT IN LIQUID-HEATERS.

Specification forming part of Letters Patent No. 190,631, dated May 8, 1877; application filed January 19, 1877.

*To all whom it may concern:*

Be it known that I, NATHANIEL M. SIMONDS, of the city and county of St. Louis, and State of Missouri, have invented a certain new and useful Apparatus for Heating Liquids, of which the following is a full, clear, and exact description, reference being had to the accompanying drawing, making part of this specification.

My improvement consists in the apparatus in which is a gas, kerosene, or other burner, whose chimney extends upward through the water in a chamber, and discharges into the upper part of or outside said chamber, preferably passing through a drum immersed in the water. The products of combustion leave the drum through vertical chimneys, that may discharge into an air-chamber, in which is suspended a vessel fitted to contain liquid, which it is desired shall be heated to about the temperature of the liquid in the outer chamber, or nearly to a boiling heat.

The drawing is one-half in side elevation and one-half in axial section, showing my improvement as applied to a coffee, tea, or milk urn. It is also adapted to the heating of carving-tables, plate-warming closets, and other similar and culinary uses.

A is the outer case, containing a lower chamber, B, in which is the gas, kerosene, or other burner C. The top D of the air-chamber B forms the bottom of the chamber E, which occupies the central and upper part of the case A. F is a chimney, which is made of metal, and which extends up through the water in chamber E to the interior of the drum G. In the top plate $g$ of the drum are a number of chimneys, $g'$, which discharge the products of combustion from the drum above the water-level in the chamber E.

The drum is immersed, or partly immersed, in the water, and is traversed by vertical water-tubes H, communicating with the water above and below the drum.

The upper portion of chamber E occupies the upper part of case A, and in said part is suspended (upon brackets $i$ or otherwise) the vessel I, in such a manner that the products of combustion and the vapor from the water in chamber E surround it (said vessel) upon every side, and keep it at any temperature that may be desired.

The products of combustion, together with the vapor, may be discharged through apertures $a$ in the upper part of the case A, and may be conveyed to a warming-closet or other culinary apparatus; or, if preferred, the products of combustion may be taken from the drum G through a pipe, K, (shown in dotted lines,) and the steam alone used for heating the vessel I; or the vessel I may be removed, and the mingled vapor and products of combustion from the upper part of the chamber E be taken for the heating of a carving-table or other heating purpose.

The plate D, as shown in my preferred form, has a central depressed portion; but said plate may be modified so as to extend horizontally inward from the case A to the chimney F, and said chimney may extend downward below the level of plate D; or the chimney may, in this modification, be attached to the lamp.

I claim—

1. The combination of burner C, chimney F, drum G, surrounded by liquid, and chimney or chimneys $g'$, discharging into chamber E above the liquid or water line in said chamber.

2. The combination of burner C, chimneys F and $g'$, drum G in chamber E, and containing tube or tubes H, and the vessel I, sustained in chamber E, and surrounded upon every side by the vapor, &c., in the upper portion of said chamber.

NATHANIEL M. SIMONDS.

Witnesses:
 SAML. KNIGHT,
 ROBERT BURNS.